(12) United States Patent
Rosas-Maxemin et al.

(10) Patent No.: US 11,727,510 B2
(45) Date of Patent: Aug. 15, 2023

(54) CONTACTLESS VEHICLE ORDERING AND AUTOMATION SYSTEM

(71) Applicant: PIED PARKER, INC., Sacramento, CA (US)

(72) Inventors: Gianni Rosas-Maxemin, Sacramento, CA (US); Robert Mazzola, Sacramento, CA (US); George Azzi, Sacramento, CA (US); Callam Poynter, Sacramento, CA (US); John Oglesby, Sacramento, CA (US)

(73) Assignee: Pied Parker, Inc., Sacramento, CA (US)

( * ) Notice: Subject to any disclaimer, the term of this patent is extended or adjusted under 35 U.S.C. 154(b) by 0 days.

(21) Appl. No.: 17/583,134

(22) Filed: Jan. 24, 2022

(65) Prior Publication Data
US 2022/0237713 A1     Jul. 28, 2022

Related U.S. Application Data

(60) Provisional application No. 63/141,425, filed on Jan. 25, 2021.

(51) Int. Cl.
*G06Q 50/12* (2012.01)
*G06Q 20/12* (2012.01)
(Continued)

(52) U.S. Cl.
CPC ............. *G06Q 50/12* (2013.01); *G06Q 20/12* (2013.01); *G06Q 30/0641* (2013.01); *G06V 20/625* (2022.01); *G06V 40/172* (2022.01)

(58) Field of Classification Search
CPC .... G06Q 50/12; G06Q 20/12; G06Q 30/0641; G06V 40/172; G06V 20/625
See application file for complete search history.

(56) References Cited

U.S. PATENT DOCUMENTS

| 5,132,914 A | 7/1992 | Cahlander et al. |
| 5,386,762 A * | 2/1995 | Gokey ............. A47J 27/14 901/7 |

(Continued)

FOREIGN PATENT DOCUMENTS

KR    10-2018-0019827 A    2/2018

OTHER PUBLICATIONS

International Search Report and Written Opinion dated May 12, 2022 in corresponding PCT Application No. PCT/US2022/013708 in 7 pages.

*Primary Examiner* — Paul Danneman
(74) *Attorney, Agent, or Firm* — Novak Druce Carroll LLP (57) ABSTRACT

A computing system, includes: a non-transitory memory; processors coupled to the non-transitory memory and configured to execute instructions to perform operations including: detecting a vehicle at a first location, executing instructions local to the first location by one or more edge processors to determine vehicle specific parameters that identify the vehicle; determining the vehicle is associated with a user account stored in a computerized vehicle management system; in response to the determining that the vehicle is associated with the user account, and transmitting instruction to a first display at the first location to present a user-tailored menu generated by using the edge processors to access a machine learning computer model based on data obtaining from the user account.

20 Claims, 5 Drawing Sheets

(51) Int. Cl.
*G06Q 30/06* (2023.01)
*G06V 40/16* (2022.01)
*G06V 20/62* (2022.01)
*G06Q 30/0601* (2023.01)

(56) References Cited

U.S. PATENT DOCUMENTS

| | | | | |
|---|---|---|---|---|
| 7,895,797 | B2* | 3/2011 | Bridgman | E04H 14/00 |
| | | | | 52/33 |
| 2009/0092723 | A1* | 4/2009 | Flynn, Jr. | G05D 23/1951 |
| | | | | 426/523 |
| 2009/0228325 | A1* | 9/2009 | Simmons | G06Q 30/0201 |
| | | | | 705/7.23 |
| 2012/0287281 | A1* | 11/2012 | Williams | G06Q 30/02 |
| | | | | 348/148 |
| 2014/0025540 | A1 | 1/2014 | Hendrickson | |
| 2019/0108566 | A1 | 4/2019 | Coleman et al. | |
| 2020/0184437 | A1 | 6/2020 | Kelly et al. | |

* cited by examiner

CONTACTLESS VEHICLE ORDERING AND AUTOMATION SYSTEM

CROSS REFERENCE TO RELATED APPLICATIONS

This application claims the benefit of U.S. Provisional Application No. 63/141,425, filed Jan. 25, 2021, which is hereby incorporated by reference in its entirety.

TECHNICAL FIELD

The present disclosure relates generally to systems and methods for vehicle and driver recognition at a drive-through using machine learning technologies to automate and streamline ordering processes and for providing user-tailored ordering menus.

BACKGROUND

Fast food is a type of mass-produced food designed with a strong priority placed on "speed of service" versus other relevant factors involved in culinary science. Fast food was originally created as a commercial strategy to accommodate the larger numbers of busy commuters, travelers and wage workers who often did not have the time to sit down at a public house or diner and wait for their meal. By making speed of service the priority, this ensured that customers with strictly limited time were not inconvenienced by waiting for their food to be cooked on-the-spot. In 2020, the fast food industry was worth an estimated $570 billion globally (Fast Food Industry Analysis 2020—Cost & Trends, available at https://www.franchisehelp.com/industry-reports/fast-food-industry-analysis-2020-cost-trends/).

However, in densely populated urban areas or busy rest areas along highways, even a fast-food restaurant cannot provide an efficient service. The bottleneck for the conventional drive-through ordering system includes limited drive-through space, limited ordering kiosk, customer ordering time, customer paying time, specific food/items being unavailable, sold out, or requiring additional time to prepare. During rush hours, both staff in the kitchen and vehicles in the waiting lines want to accelerate the order preparation time.

In light of the global COVID-19 pandemic, a contact-free pickup option can be an economic lifeline for restaurants. The conventional drive-through ordering system still requires staff to order, prepare, package, and deliver food, which increases the risk of spreading virus. It is therefore necessary to implement a more automated system for the drive-through service.

The disclosed system and method are directed to overcoming one or more of the problems set forth above and/or problems of any prior art.

SUMMARY

A computing system is disclosed. According to one aspect, the system includes a non-transitory memory and one or more processors coupled thereto, a first display coupled to a kiosk, a second display coupled to an electronic device, and a camera coupled to the computing system. The one or more processors are configured to execute instructions comprising: identifying a user at a first location using the camera coupled to the computing system, executing instructions local to the first location by one or more edge processors to determine one or more user specific parameters that identify the user; determining the user is associated with a user account stored in a computerized user management system by determining that the user identified by the one or more user specific parameters matches the user account stored in the computerized user management system by comparing the one or more user specific parameters against a user account database included in the computerized user management system; in response to the determining that the user is associated with the user account stored in the computerized user management system, transmitting an instruction to the first display coupled to the kiosk at the first location to present a user-tailored menu generated by using the edge processors to access a machine learning or behavior analysis computer model based on data obtained from the user account; receiving a payment of one or more orders with respect to the user account by executing a payment system, wherein the payment is made on the first display or a user application associated with the user account; and in response to receiving the payment, transmitting the one or more orders to the second display coupled to the electronic device at a second location.

According to another aspect, the operations further comprising: determining that the user is not associated with the user account stored in the computerized user management system; in response to determining the user is not associated with the user account stored in the computerized user management system, transmitting an instruction to the first display at the first location to present a default menu; receiving payment of one or more orders by executing the payment system, wherein the payment is made on the first display; and in response to receiving the payment, transmitting the one or more orders to the second display.

According to yet another aspect, the camera coupled to the computing system is an Automatic License Plate Recognition (ALPR) camera that is configured to recognize a license plate of a vehicle associated with the user. According to yet another aspect, the one or more user specific parameters that identify the user comprises the license plate of the vehicle associated with the user.

According to yet another aspect, the camera coupled to the computing system comprises face recognition artificial intelligence or machine learning algorithms to determine the one or more user specific parameters that identify the user.

According to yet another aspect, the user-tailored menu comprises one or more of a recommendation menu, recent orders, a loyalty and reward program in association with the user account.

According to yet another aspect, the second location comprises one or more food preparing stations.

According to yet another aspect, the machine learning model is trained to identify certain features of a user's preferences, such as, identify certain aspects of a user's characteristics.

According to yet another aspect, the user-tailored menu is updated based upon updates received from the second location.

According to yet another aspect, the updates received from the second location are configured by a food preparing staff.

According to yet another aspect, the user-tailored menu is further based on busyness of the second location, wherein the busyness is determined by an average time of preparing an order.

According to yet another aspect, the payment executed in the second display include using credit card, debit card, cash, or any wireless payment such as PAYPAL, VENMO, ZELLE, APPLE PAY, Bluetooth payment, NFC payment, and/or the like, and/or any combination thereof.

According to yet another aspect, the one or more processors are configured to execute instructions further comprising: after transmitting the one or more orders to the second display at the second location, directing the user to a waiting zone by presenting a set of navigation instructions to the user.

According to yet another aspect, the one or more processors are configured to execute instructions further comprising: transmitting a notification to the user application associated with the user account when the one or more orders are ready.

According to yet another aspect, the second location further comprises an auto-food maker robot, wherein the auto-food maker robot is configured to receive the one or more orders and execute an auto-food preparation system to prepare the one or more orders.

A method for vehicle drive-through ordering is disclosed. According to one aspect, the method comprises: identifying a user at a first location using a camera coupled to a computing system, executing instructions local to the first location to determine one or more user specific parameters that identify the user; determining the user is associated with a user account stored in a computerized user management system by determining that the user identified by the one or more user specific parameters matches the user account stored in the computerized user management system by comparing the one or more user specific parameters against a user account database included in the computerized user management system; in response to the determining that the user is associated with the user account stored in the computerized user management system, transmitting an instruction to a first display at the first location to present a user-tailored menu generated to access a machine learning or behavior analysis computer model based on data obtained from the user account; receiving a payment of one or more orders with respect to the user account by executing a payment system, wherein the payment is made on the first display or a user application associated with the user account; and in response to receiving the payment, transmitting the one or more orders to a second display at a second location.

A non-transitory, computer readable media, comprising instructions that when executed by a processor, cause the processor to perform a method for vehicle drive-through ordering is disclosed. According to one aspect, the instructions comprise: identifying a user at a first location using a camera coupled to a computing system, executing instructions local to the first location to determine one or more user specific parameters that identify the user; determining the user is associated with a user account stored in a computerized user management system by determining that the user identified by the one or more user specific parameters matches the user account stored in the computerized user management system by comparing the one or more user specific parameters against a user account database included in the computerized user management system; in response to the determining that the user is associated with the user account stored in the computerized user management system, transmitting an instruction to a first display at the first location to present a user-tailored menu generated to access a machine learning or behavior analysis computer model based on data obtained from the user account; receiving a payment of one or more orders with respect to the user account by executing a payment system, wherein the payment is made on the first display or a user application associated with the user account; and in response to receiving the payment, transmitting the one or more orders to a second display at a second location.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Considering the problems associated with drive-through ordering, it would be desirable to provide systems and methods for drive-through ordering using vehicle, driver and passenger recognition, using machine learning to provide a user-tailored menu, and automated procedures to streamline the ordering and delivery process.

In particular, the solutions discussed herein such as a user-tailored menu generated based on a dynamic reflection of a customer's personal style and taste, busyness of the kitchen, specific food preparation times, automated food preparation, and/or the like, can effectively solve problems associated with drive-through ordering by using artificial intelligence and machine learning techniques.

In some embodiments, upon a customer vehicle's arrival to an ordering station (including, but not limited to, a kiosk or a drive-through ordering panel) equipped with an ALPR camera system, the ALPR camera system may recognize the license plate of the customer vehicle and identify the vehicle, and consequently the associated user account in a user account database. In some embodiments, the camera system may recognize the driver or the passengers in the vehicle using machine learning or artificial intelligence with face-recognition algorithms and the associated user account in a user account database. The user-tailored menu may be shown on a screen at the ordering station (e.g., a display on a kiosk) or on a user device. Examples of a user device may include but are not limited to a smartphone, tablet PC, laptop, computer or a device installed on the customer vehicle capable of radio frequency (RF) signal communications. Examples of RF signals may include, but are not limited to, Bluetooth, Bluetooth Low-Energy (BLE), Wi-Fi, NFC, Zigbee, Ultra-Wideband (UWB) and cellular network standards such as 4G, Long Term Evolution (LTE) and 5G. In some embodiments, after ordering the customer may pay at the ordering station or through the graphical user interface (GUI) on the screen of the user device.

In an example scenario, when a vehicle is approaching a drive-through service station, an ALPR camera system may recognize the customer's license plate. The ALPR camera system may then search a vehicle and user database to identify the customer's user account. In some embodiments, when a vehicle approaches the drive-through service station, a computer system with a camera may recognize the driver or passengers in the vehicle, and using machine learning (ML) and artificial intelligence with face-recognition algorithms, may identify the driver or passengers and their respective customer user accounts in the user database. In some embodiments, after identifying the customer, an order processing system may display a user-tailored menu for the customer on a kiosk with a display screen or a user device. The user-tailored menu may be generated using artificial intelligence and machine learning technologies. The user-tailored menu may be generated based on a customer's order history, busyness of the kitchen, a specific item's preparation time, time of the day, day of the week, and/or the like. Artificial intelligence and machine learning technologies may weigh different customers' preferences, in addition to various other factors to provide better options for a particular customer. In some embodiments, if a customer asks for the fastest options while arriving during rush hour, the order processing system may provide the fastest meal options to that customer. In some embodiments, if the customer arrives during off-peak hours, the order processing may provide a wide variety of discounted, special offers, or customer preferred meals to the customer to select. In some embodiments, if the customer comes in at an afternoon time which may be a coffee break time, the order processing system may provide beverage options rather than meal options. In some embodiments, after ordering the customer may pay at the ordering station, or through the user device.

A user's device may receive a message (such as a pop-up notification or a smartphone app message) once it is close to an ordering kiosk or a waiting space. In some embodiments, the message may include a link to execute an app that enables online ordering and payment transactions. If a smartphone application has already been downloaded, information about the user may be used to auto-complete parameters for ordering requests that may be automatically transmitted by the user device. This request may be sent to the ordering application servers which process the transaction. This may be especially valuable during rush hours, where every additional second entering an ordering station may cause significant traffic delays.

As discussed above, in some embodiments, when a user in a vehicle enters an ordering station, the ALPR camera system may recognize the license plate of the user's vehicle and identify the respective user account in a user database. The user may be the driver of the vehicle or a passenger in the vehicle. In some embodiments, when a vehicle approaches the drive-through service station, a computer system with a camera may recognize the user (i.e., the driver or passengers in the vehicle), and using machine learning and artificial intelligence with face-recognition algorithms, may identify the driver or passengers and their respective customer user accounts in the user database. The user may then be prompted for ordering via a software-based ordering application on the user device. Payment may be charged to the user using stored payment information after the order is fulfilled. Examples of payment methods may include, but are not limited to, credit card, APPLE PAY, PAYPAL, electronic bank payment, ZELLE, VENMO and other methods of electronic payment.

Upon entering and/or leaving an ordering station, a user in the vehicle may receive a notification on their user device from an RF signal as discussed above. Opening the notification on the user device may open the ordering application to allow the user to place an order. In some embodiments, the ordering application may ask the user to verify the order prior to confirming the order with the ordering station. In some embodiments, the user may not have access to a data network upon entering the ordering station, and the payment of the order may be paid once a data network is available.

Smart ordering systems as discussed above increase efficiency with respect to drive-through ordering, accelerate the speed of the meal preparation, reduce traffic, reduce ordering time, diminish or eliminate the need for a driver or passenger (i.e., user) input, more accurately predict customer meal preferences, increase security, and lead to faster processing of drive-through ordering transactions. By shortening the time spent looking at the menu, less cars will be congested in the drive-through, significantly decreasing traffic and accelerating food delivery time. Furthermore, the smart ordering systems may also provide curbside waiting rather than picking up at a pickup window. Therefore, there is no need to reconstruct the building with a pickup window. Instead, the ordering station may only require a kiosk or a waiting space which may be demarcated or tracked in the ordering application. In some embodiments, the smart system may also be integrated with other autonomous robotic kitchen assistants such as FLIPPY, an auto-food maker, an auto-beverage maker, and/or the like or any combination thereof.

Figure 1:
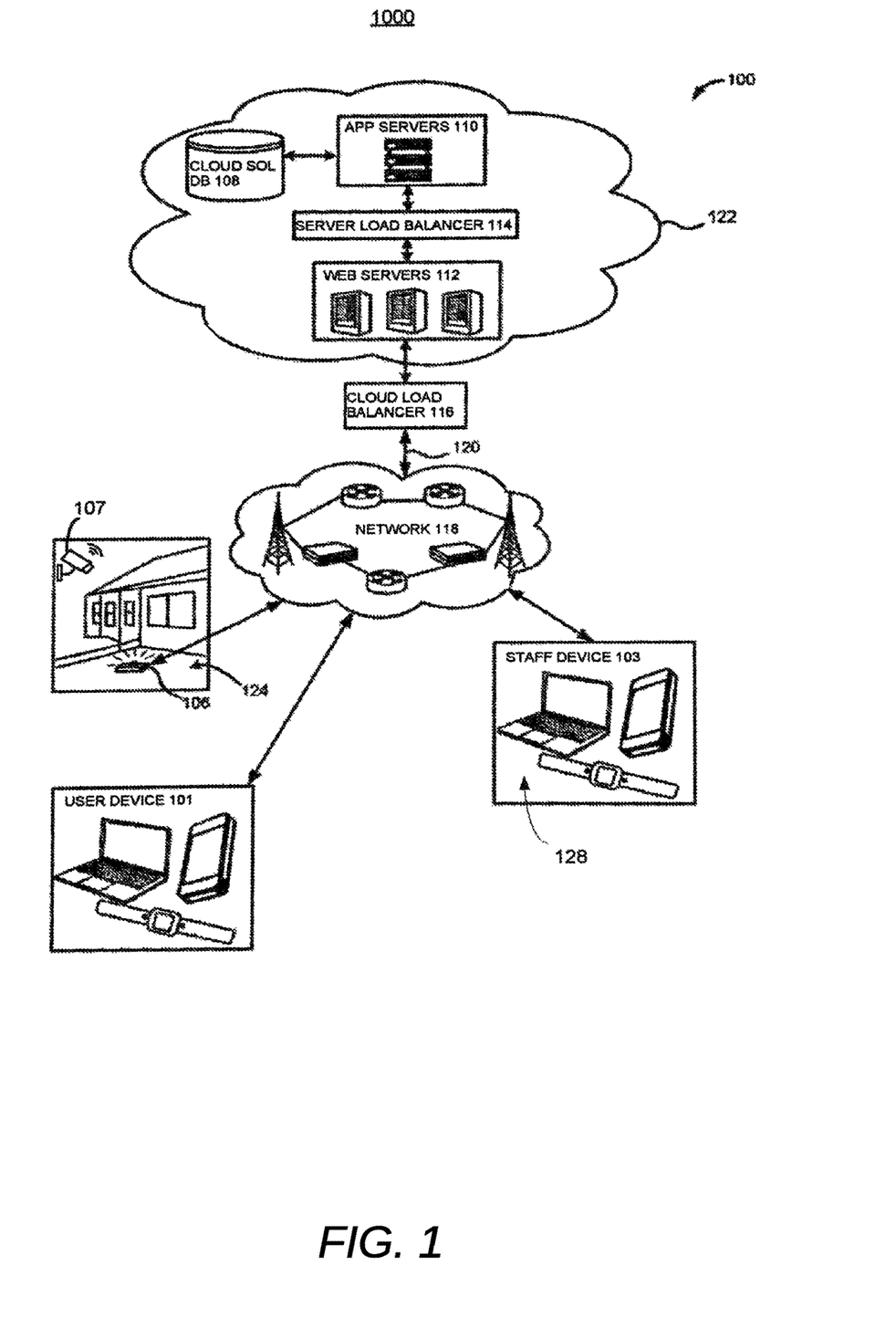
FIG. 1 is a schematic diagram illustrating an example drive-through ordering system in accordance with some embodiments of the present disclosure.

FIG. 1 is a schematic diagram 1000 illustrating a drive-through ordering system 100 in accordance with some embodiments of the present disclosure. The drive-through ordering system 100 may include one or more user devices 101, staff devices 103, sensors 106, or any combination thereof communicatively coupled to one or more databases 108, application servers 110, web servers 112, server load balancers 114, cloud load balancers 116, or any combination thereof over a communications network 118.

The communications network 118 may be any multi-hop network that covers regions, countries, continents, or any combination thereof. Examples of the communications network 118 may include but are not limited to a cellular network such as a 3G network, a 4G network, a 5G network, a long-term evolution (LTE) network, a sonic communication network, a satellite network, a wide area network such as the Internet, or any combination thereof. The web servers 112, the application servers 110, the server load balancers 114, the cloud load balancers 116, or any combination thereof can be communicatively coupled to the communications network 118 through connections 120. The connections 120 may be wired connections, wireless connections, or any combination thereof.

The drive-through ordering system 100, or a portion therein, may include a web and/or mobile application hosted by cloud computing, or cloud, 122 such as a WINDOWS AZURE cloud, an Amazon Elastic Computer Cloud (AMAZON EC2), a GOOGLE APP ENGINE, or any combination thereof. For example, the drive-through ordering system 100 may include a web and/or mobile application run on virtual machines hosted on the one or more application servers 110, web servers 112, or any combination thereof.

In one embodiment, the cloud 122 may include the one or more application servers 110, web servers 112, databases 108, server load balancers 114, cloud load balancers, portions therein, or any combination thereof. The drive-through ordering system 100 may rely on processing and storage resources provided by the one or more application servers 110, web servers 112, databases 108, server load balancers 114, cloud load balancers 116, or any combination thereof.

The cloud load balancers 116 may provide traffic load balancing and distribute client requests among multiple web servers 112. The web servers 112 may include HTTP servers or rely on the cloud 122 to handle HTTP requests. The web servers 112 can also be instantiated and managed by the cloud 122.

The server load balancers 114 may balance interactions between the web servers 112 and the one or more application servers 110. The application server 110 may handle application logic and interact with the database 108 to store data and application states. The web servers 112, the application servers 110, or any combination thereof may include rack-mount servers, cluster servers, blade servers, main frames, dedicated desktops or laptops, or any combination thereof.

The databases 108 may be one or more SQL databases. The application servers 110 may interface with one or more SQL servers managing the SQL databases. The application data and application states may be stored in a cloud-managed SQL database. In some embodiments, the database 108 may be a document-oriented database including a NoSQL database such as a MONGODB database.

The application servers 110, the web servers 112, the cloud load balancers 116, the server load balancers 114, and the cloud SQL databases 108 may be any of the servers, load balancers, and databases as discussed in U.S. Pat. No. 9,176,773, the content of which is hereby incorporated by reference in its entirety.

In some embodiments, the user devices 101 and the staff devices 103 may include a portable computing device such as a smartphone, a tablet, a laptop, a smartwatch, a personal entertainment device, or any combination thereof.

In other embodiments, the user device 101 or the staff device 103 may include a desktop computer. The user device 101 may be used by a user or client of the drive-through ordering system 100 to order food and pay for the order from the drive-through ordering system 100. The staff device 103 may be used by a staff of the drive-through ordering system 100 to receive an order from the user on the drive-through ordering system 100.

The drive-through ordering system 100 may also include one or more ordering sensors 106 and one or more computer systems with a camera 107 located at one or more locations 124. In some embodiments, the location 124 is an ordering space in which a vehicle may be temporarily parked.

In some embodiments, the ordering sensor 106 may detect a device such as the user device 101. The computer system with a camera 107 may be located in close proximity to the location 124. In some embodiments, the staff device 103 may be located at another location 128 where staff may prepare the order placed by the user.

Figure 2:
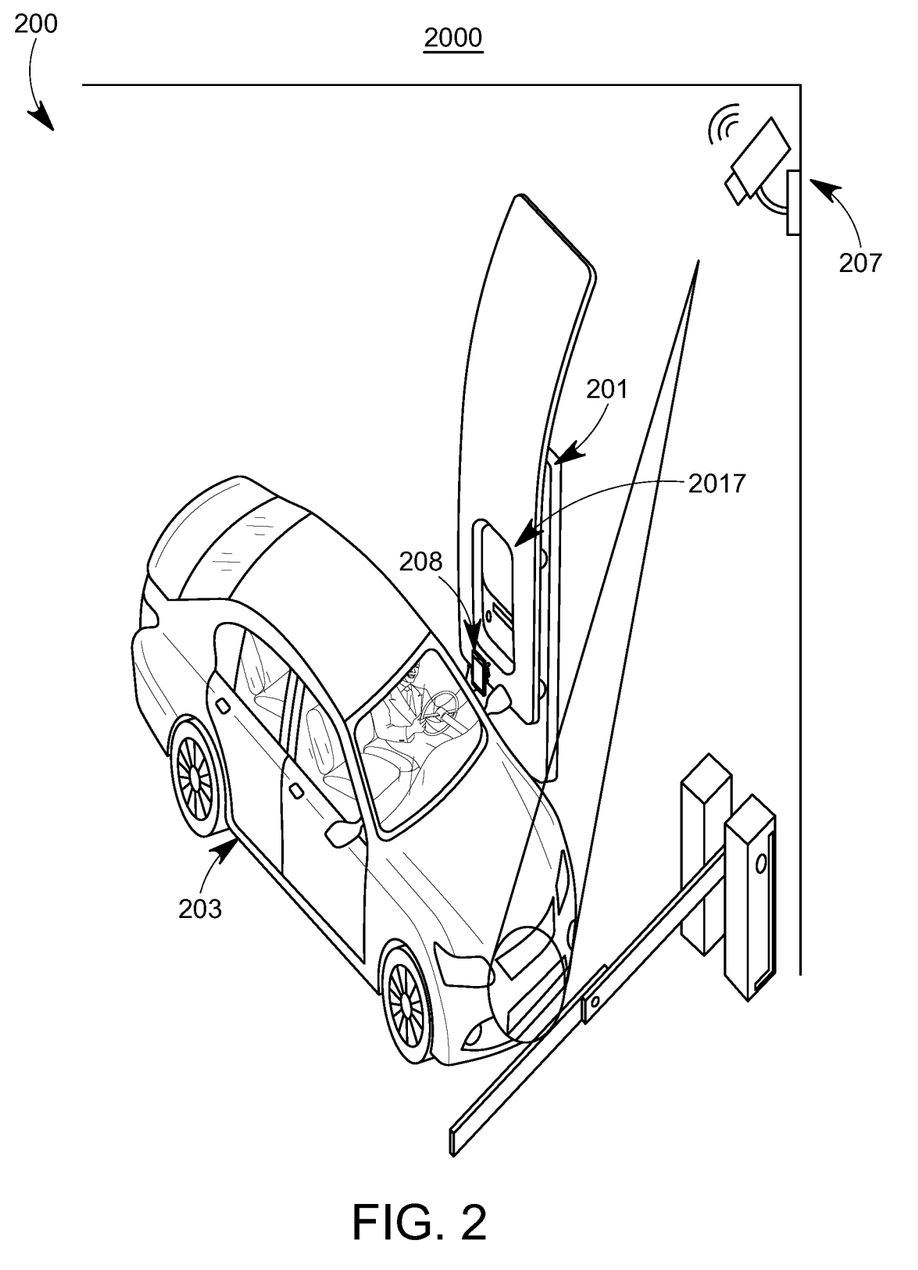
FIG. 2 is a schematic diagram illustrating an example drive-through ordering system in accordance with some embodiments of the present disclosure.

FIG. 2 is a schematic diagram 2000 illustrating a drive-through ordering system 200 in accordance with some embodiments of the present disclosure. The drive-through ordering system 200 may include a computer system with a camera 207, an ordering station 201 having an ordering panel 2017, a vehicle 203, and a user device 208.

In some embodiments, the ordering panel 2017 may include an electronic display, a touch screen, and/or the like. Examples of the display or the touch screen may include but are not limited to an active matrix emitting diode (AMO-LED), light-emitting diode (LED), organic LED (OLED), electrophoretic, liquid crystal, e-paper, and/or the like and/or combinations thereof. In some embodiments, the ordering panel 2017 may also include various input and output (I/O) devices, such as a keyboard, a mouse, button inputs, microphone, vehicle sensor, eye sensor, video display, and/or the like.

In some embodiments, the user device 208 may include a portable computing device such as a smartphone, a tablet, a laptop, a smartwatch, a personal entertainment device, or any combination thereof.

In some embodiments, the computer system with a camera 207 may include an Automatic License Plate Recognition (ALPR) camera that is capable of recognizing the license plate of the vehicle 203. In some embodiments, the computer system with a camera 207 may use machine learning (ML) and artificial intelligence with face-recognition algorithms to identify the driver or passengers in the vehicle 203. In some embodiments, the computer system with a camera 207 is able to capture still images and/or video. The computer system with a camera 207 may include a vehicle sensor used to detect motion, or may be in communication with a vehicle sensor as a separate device (not shown). In some embodiments, the vehicle sensor is a passive infrared sensor (PIS), an ultrasonic sensor, microwave sensors, magnetic sensor, camera detector, motion sensor, tomographic sensors, and/or based on comparison of pixel records, and/or the like. In some embodiments, the computer system with a camera 207 has a camera with a fisheye lens. In some embodiments, the computer system with a camera 207 has a camera that is plenoptic. The computer system with a camera 207 may be in communication with devices including parking sensors, vehicle devices, wireless devices, and/or the like and/or combinations thereof.

Figure 3:
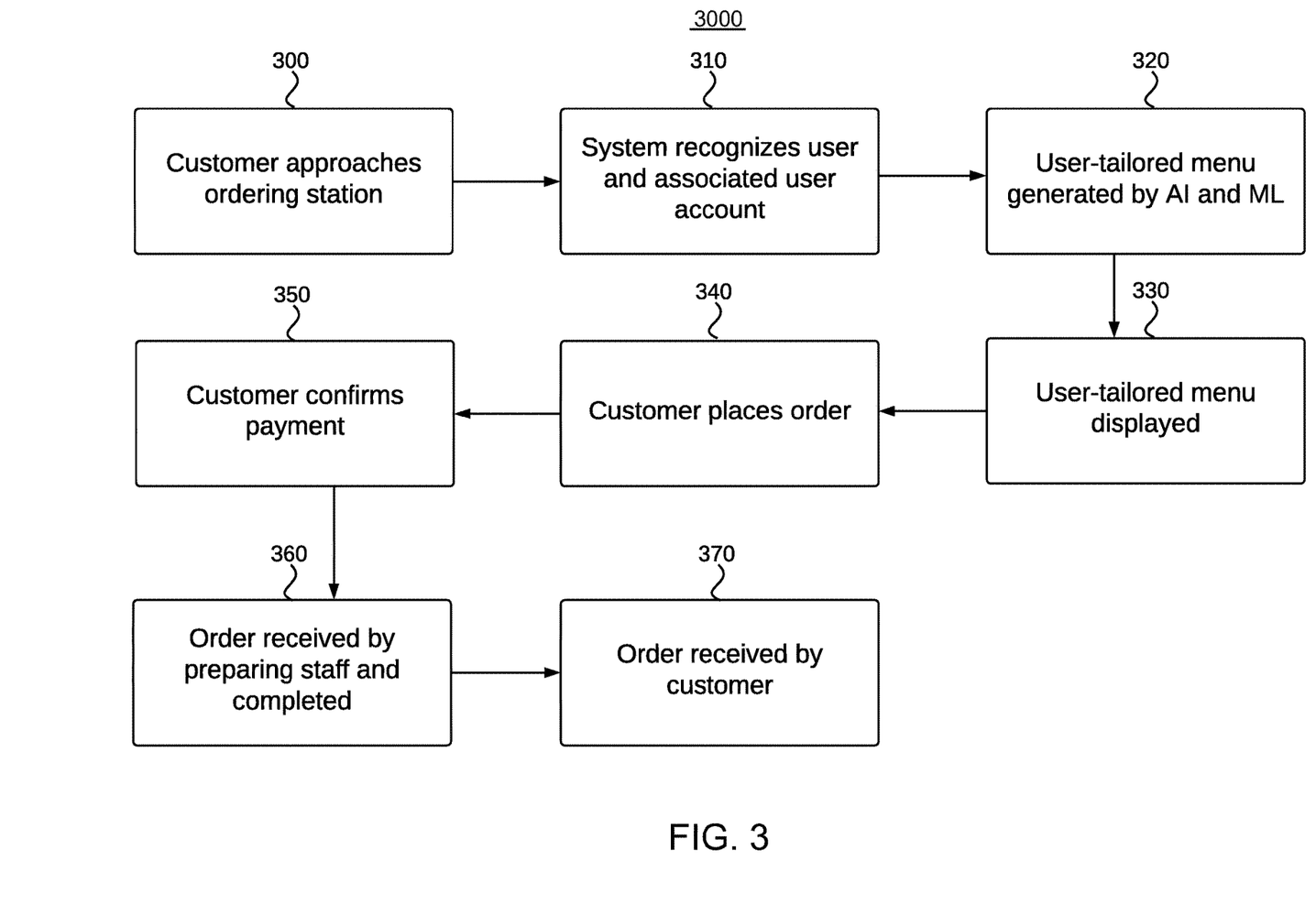
FIG. 3 is a flowchart illustrating an example process of a drive-through ordering system in accordance with some embodiments of the present disclosure.

FIG. 3 is a flowchart 3000 illustrating the process of the drive-through ordering system 300. The flowchart 3000 starts with step 300, when a customer approaches the ordering station. When a customer approaches the ordering station, the process moves to step 310 during which the computer with a camera system of the drive-through ordering system may recognize the license plate of the vehicle and identify the user associated with the vehicle in the customer's user account. Alternatively, when a customer approaches the ordering station in a vehicle, the computer with a camera system of the drive-through ordering system may recognize, using machine learning or artificial intelligence based face-recognition algorithms, the customer which may be any individual in the vehicle including passengers or the driver of the vehicle. If the user is not identified, a new user account may be created and associated with the license plate. In some embodiments, an image or video recording of the vehicle may be taken by the drive-through ordering system and subsequently a determination can be made whether or not the vehicle is already stored in the database (i.e., associated with an already existing user account). In other words, a scoring system may determine the likelihood that a vehicle shares the same features of a particular vehicle that has been recorded entering the lot at a previous time. In some embodiments, the partial identification of a vehicle may be combined with the identification of a user associated with the vehicle. An RF signal including but not limited to BLE, NFC, or RFID may be used to detect the proximity of a user inside their vehicle.

Next, in step 320, when the customer's user account has been identified, a user-tailored menu may be generated using artificial intelligence, machine learning, behavior analysis, and/or the like, and or any combinations thereof based on the information or data obtained from the user account. In some embodiments, a machine learning model may be trained/tuned based on training data collected from positive recognition, false recognition, and/or other criteria. In some aspects, the ML model may be a deep neural network, Bayesian network, and/or the like and/or any combinations thereof. Although various types of ML models may be deployed to refine some aspects for identifying whether or not a location is occupied, in some aspects, one or more ML-based classification algorithms may be used. Such classifiers may include but are not limited to: MobileNet object detector, a Multinomial Naive Bayes classifier, a Bernoulli Naive Bayes classifier, a Perceptron classifier, a Stochastic Gradient Descent (SGD) Classifier, and/or a Passive Aggressive Classifier, and/or the like. Additionally, the ML models may be configured to perform various types of regression, for example, using one or more various regression algorithms, including but not limited to: Stochastic Gradient Descent Regression, and/or Passive Aggressive Regression, etc. In some embodiments, a neural network may be trained for a given ML model using backpropagation. In some aspects, a ML model neural network includes neural network modules that comprise feed-forward computation graphs with input nodes, hidden layers, and output nodes. In some embodiments, for classifications that involve images, pixel-values of an input image forming part of a classification may be assigned to input nodes. Such input nodes may be fed through the network and pass a number of non-linear transformations. In some embodiments, once the input nodes are fed forward, the output node may yield a value that corresponds to the class inferred by the neural network.

The process then moves to step 330, where the user-tailored menu may be shown on the screen at the ordering station. In some embodiments, the user-tailored menu may also be shown on the interface of a customer's user device (e.g., smartphone or any other wireless devices as discussed above) via the ordering application. As discussed above, the customer may be one or more users including the driver or any passenger in the vehicle. The user-tailored menu may include other past orders, similar orders, substitute orders, and/or special deals on certain items. The user-tailored menu may be tailored based on a number of occupants in the vehicle.

Next, the process moves to step 340, where the customer places the order. The customer may place the order on an application of the user device or on the screen of the ordering station. Next, the process moves to step 350 where the customer may confirm the payment on the screen of the ordering station or on the ordering application of the user device. In some embodiments, the user may be in a remote location confirming and paying for the order while an autonomous vehicle is at the ordering station in the user's stead. In some embodiments, the payment may be completed using, but not limited to, credit card, debit card, cash, or any wireless payment such as PAYPAL, VENMO, ZELLE, APPLE PAY, Bluetooth payment, near-field communication (NFC) payment, and/or the like, and/or any combination thereof. In some embodiments, payment may occur without any further action from the user. In some embodiments, once the order is confirmed, payment may be processed on the user's account using payment information on file.

Next, after payment is confirmed, the process moves to step 360 where the order is received by the preparing staff and completed. Examples of where the order may be received by the preparing staff include, but are not limited to, the kitchen, office, dining room or any location where the staff may be located. In some embodiments, the order may be displayed on a staff device as discussed in FIG. 1 to show the order to the staff so they may prepare the order for the customer. In some embodiments, the order may be displayed on an electronic display at a location visible to the preparing staff. The process then moves to step 370 where the order is received by the customer.

In some embodiments, the customer may drive to another waiting space to wait to receive the ordered food to be delivered or for receiving a notification on the ordering application (on a user device) that the order is ready. In some embodiments, marked parking stations may be selected based on a number of customers waiting for an order. In some embodiments, if the number of customers exceeds a threshold, or an estimated time to complete current orders in a queue, vehicles may be assigned to marked parking stations, which may be marked virtually or physically, such as by combinations of numbers/letters/characters.

In some embodiments, after the payment is placed by the user, the screen at the ordering station or the user device may show or direct the customer to park their vehicle at the waiting space, or may be indicated on the ordering application or a navigation application including but not limited to Google Maps, Apple Maps, or Waze.

In some embodiments, since the system predicts what a user prefers to order, the system may notify staff regarding what type of food or beverages should be prepared in advance, so they can start working on food preparation.

Figure 4:
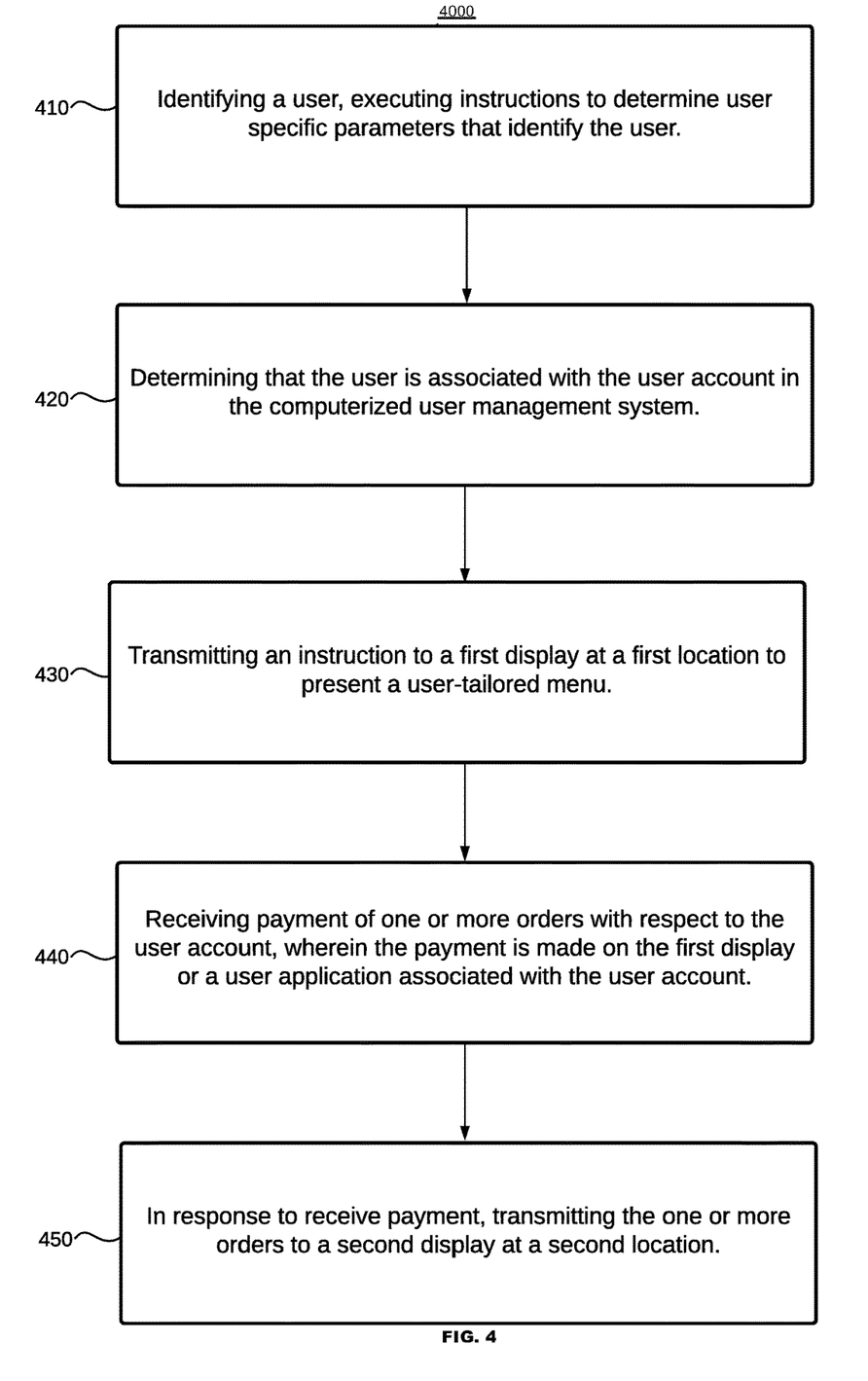
FIG. 4 is a flowchart illustrating an example method of operating the drive-through ordering system in accordance with some embodiments of the present disclosure.

FIG. 4 is a flowchart 4000 illustrating process flow of the drive-through ordering system 300. The process starts with state 410, when a customer vehicle approaches the ordering station, identifying a user and executing instructions on a computing device to determine user specific parameters that identify the user. In other words, in some embodiments the computer with a camera system of the drive-through ordering system may identify the user (i.e., driver or any passenger) of the vehicle using machine learning or artificial intelligence based face-recognition algorithms. In some embodiments, the computer with a camera system may use ALPR to recognize the license plate of the user's vehicle and identify the respective user account in a user database.

The process then moves to state 420 to determine if the user is associated with a user account stored in a computerized user management system (e.g., a PIED PARKER system). This is done by determining that the user identified by the one or more user specific parameters matches the user account stored in the computerized user management system by comparing the one or more user specific parameters against a user account database included in the computerized user management system.

Next, the process moves to state 430, in response to the determining that the user is associated with the user account stored in the computerized user management system, transmitting instructions to a first display coupled to a kiosk (e.g., the ordering panel 2017) at the first location to present a user-tailored menu generated by using the edge processors to access a computer model having artificial intelligence, machine learning (ML), behavior analysis, and/or the like, and/or the combination thereof using data obtaining from the user account. In some embodiments, the first display may be on an electronic device such as a smartphone, tablet PC, or smart watch.

In some embodiments, the training engine of the ML model may include a scenario module, including a food recommendation for a particular time, day, week, holiday, birthday, anniversary of the user, and/or the like. In some embodiments, such scenarios may manually receive human inputs. In some embodiments, a neural network may be trained for a given ML model using backpropagation.

In some embodiments, an ML model neural network includes neural network modules that include feed-forward computation graphs with input nodes, hidden layers, and output nodes. In some embodiments, for classifications that involve images, pixel-values of an input image forming part of a classification may be assigned to input nodes. Such input nodes may be fed through the network and pass several non-linear transformations. In some embodiments, once the input nodes are fed forward, the output node may yield a value that corresponds to the class inferred by the neural network.

In some embodiments, once a ML model is trained, the ML model may receive one or more inputs, e.g., one or more data obtained from database of the user account, and classify those inputs as having a particular numeric affinity for each class for which the network was trained. In some embodiments, a ML model may be specific to a particular food choice or group of food choices, such as a beverage ordering or a meal ordering. In some embodiments, the ML model may be specific to a recommendation at specific times, such as a rush hour in the morning. In some embodiments, a ML model may be trained to identify certain features of user's preferences, such as, identify certain aspects of the user's characteristics (examples may include, but are not limited to, a coffee lover, hamburger lover, vegetarian and/or the like).

The user-tailored menu may be based on demographic or ethnic characteristics (examples may include, but are not limited to, age, race, religion, sex or gender, sexual orientation, language, culture, or food allergy), dietary plans (examples may include, but are not limited to, plant-based diet, low-carb diet, low-fat diet, mediterranean diet, DASH diet, flexitarian diet, or weight watchers diet), mood preferences, sugary/non-sugary/sugar substitute drink preferences, size preferences, ice/hot preferences, spicy/sour/bitter/sweet preferences, and/or the like. After choosing, the user-tailored menu may auto-populate the choices that the user regularly makes and/or has an affinity towards with preferential placement or defined characteric(s). In some embodiments, there may be advertisements for stores near other drive-throughs to include more accurate advertising with higher conversion rates, instead of, for example, advertising only the specials of the month/season.

In some embodiments, the user-tailored menu may also upsell certain categories of food before or after certain activities, e.g., energy/fitness drinks before or after gyms. Suggestions may be prompted based on synchronization with a user's calendar, and, for example, cross referencing the textual content of such events using natural language algorithms. For example, consider the situation where a user has a spin class in their calendar from 1:00-2:00 PM, and arrives at the drive-through within 15 minutes; based on a determination that a "spin class" falls under a specific category, such as 'fitness activity,' a particular beverage or food item may be suggested on the user-tailored menu that is supposed to be energizing or rejuvenating. In some embodiments, applications on the phone may be recording textual conversations and using natural language processing to understand them and suggest advertisements. Similarly, items may be suggested based on certain word associations. In some embodiments, by hearing certain conversations about 'vegan' items, vegan items may be suggested on the user-tailored menu. In some embodiments, other word associations may be determined using ML analysis of the words used and items selected, making for better predictions for items in the future. In some embodiments, the user-tailored menu may display the remaining time to wait for the order to be received.

In some embodiments, the system may identify who might also be in the vehicle by using BLE, NFC, RFID, facial recognition, third party app syncing, location-based recognition, and/or the like, and or any combination thereof. Once another user is identified, the user device may receive a message (such as a pop-up notification or a smartphone app message) that enables users to join the online ordering, to share the menu, or to synchronize the order to the other users by using AIRDROP, SNAPDROP, INSTASHARE, and/or the like. After identifying other users in the vehicle, the other users' data from a Web or deep link of external smart devices may be retrieved to help the system learn demographic preferences or other preferences of their corresponding ordering archetypes (e.g., spouse, child, or others in the vehicle) as discussed above with respect to user-tailored menus. In some embodiments, this feature may invite users within the area next to the car, and it may also limit the user in the area where the vehicle is based on images captured by the camera. In some embodiments, one user may control the final 'cart' of items added by the one or more users that select items in a vehicle, and may edit or remove certain items.

In some embodiments, the system may provide the user an order preparation timer or an estimated time of arrival for the user to pick up an order. In some embodiments, a particular area may be geofenced to determine when a push notification should be sent. In some embodiments, it may be estimated: "when is the estimated pickup time customer No. 50 can get their food on average?" "when is the estimated pickup time of customer No. 100?" "When is the estimated pickup time of customer No. XXXXX?" In some embodiments, factors like the time of day, week, month, season, and/or the like, can all be used in performing multivariate group analysis.

In some embodiments, push notifications may show advertisement information based on the location of the vehicle. In some embodiments, the system may conduct a quick assessment of what the vehicle can be seeing or the direction of their vehicle and the right ad might be very useful to CLEAR CHANNEL, GOOGLE, FACEBOOK, HEARST MEDIA, etc. so they may send more useful ads.

In some embodiments, using ML, suggestions for certain orders may be made based on vehicle type by training the model with user data.

Using one or more cameras at the site, based on a number of vehicles detected using ML, the flow of vehicles navigating to the ordering and pickup window may be determined. From there the average vehicle speed, the length of drive-through within the lanes (e.g., two lanes) navigating vehicles, and the food/drink orders incoming time may be estimated and calculated. By doing so, the ML may be trained to consider the factors regarding the site environment.

In some embodiments, ML may alert or notify the staff or the customers that certain items on the menu are low or out-of-stock. In some embodiments, certain items may be taken off the menu based on availability or recalls (e.g., asparagus from a certain region, romaine lettuce from certain providers, etc). In some embodiments, it may notify the distribution center regarding the level of stockpiles and anticipate needed deliveries before such items are out of stock.

In some embodiments, pricing systems may be dynamically priced based on length of lines, times to wait, etc., and may charge less for the longer lines and charge more for shorter lines.

Some examples of user-tailored menus include:
1. Custom past orders (e.g., no pickles, almond milk coffee).

2. Visual customizations
   a. Seasonal theme, based on preferences such as what holidays they celebrate (e.g., signature drinks for certain holidays).
   b. Colors, or other themes selectable on the app (by the user or based on preferences).
   c. List without pictures (if the user does not like pictures).
   d. Food with pictures (if available, ingredient list), or other information underneath.
   e. Scrolling menu with the app or change page, use the app like a remote controller.
   f. Search on their user device for certain items, e.g., everyone in the vehicle can connect and pick their order on their own respective user device.
3. Based on diet preferences.
4. Based on calorie focused, vegetarian, vegan, kosher, low carb, and/or the like.
5. Based on mood.
6. Based on food preferences, e.g., ethnicity, food type (e.g., spicy, sour, bitter), and/or the like.

The process then moves to state 440, where payment for one or more orders with respect to the user account may be received by executing a payment system. The payment may be made on the first display or a graphical user interface of the ordering application on a user device (e.g., the user device 208).

The process then moves to state 450, in response to receiving the payment, the one or more orders may be transmitted to a second display at a second location (e.g., the kitchen). In some embodiments, the second location includes one or more food preparing stations. In some embodiments, it may be a kitchen, a food station, a food truck, and/or the like, and/or the combination thereof.

In some embodiments, when executing the payment system, it may charge a fee to the user account. If there is no user account, it may include charging a fee to user by using payment methods including credit card, debit card, cash, or any wireless payment such as PAYPAL, VENMO, ZELLE, APPLE PAY, Bluetooth payment, near-field communication (NFC) payment, and/or the like, and/or any combination thereof.

In some embodiments, the user-tailored menu may include showing a recommendation menu, recent orders, a loyalty and reward program in association with the user account. In some embodiments, some menus or items may only be available for certain users, based on a certain number of points in a loyalty or reward program.

In some embodiments, the user-tailored menu generated by using the edge processors to access the machine learning or behavior analysis computer model is further based on menu updates received from the second location. In such cases, the menu update may be configured to be input by a food preparing staff. Therefore, if the menu has any update on that day or that moment, for instance, when some of the ingredients are insufficient, the user-tailored menu may be updated immediately.

In some embodiments, the user-tailored menu generated by using the edge processors to access the machine learning or behavior analysis computer model are further based on the busyness of the second location. For instance, the busyness may be determined by the average time of preparing an order. In some examples, the user-tailored menu may be adjusted due to the busyness of the kitchen, e.g. if the average time of preparing an order is increasing or other factors which are causing delays to fulfill a certain order.

In some embodiments, after transmitting the one or more orders to the second display at the second location to present the order, directing the vehicle to a waiting zone by presenting a set of navigation instructions to the user. The navigation instructions may be displayed on the user's user device including but not limited to a smartphone, tablet PC, smart watch, or laptop PC. Therefore, it reduces the time waiting in the ordering station by directing the vehicle to a waiting space, a parking space, a curbside, and/or the like, and/or the combination thereof.

In some embodiments, since the vehicle may be directed to another area, the system may transmit a notification to the user application associated with the user account when the order is ready.

In some embodiments, the second location further includes an auto-food maker robot. And the auto-food maker robot is configured to receive one or more orders and execute an auto-food preparation system to prepare the order.

Figure 5:
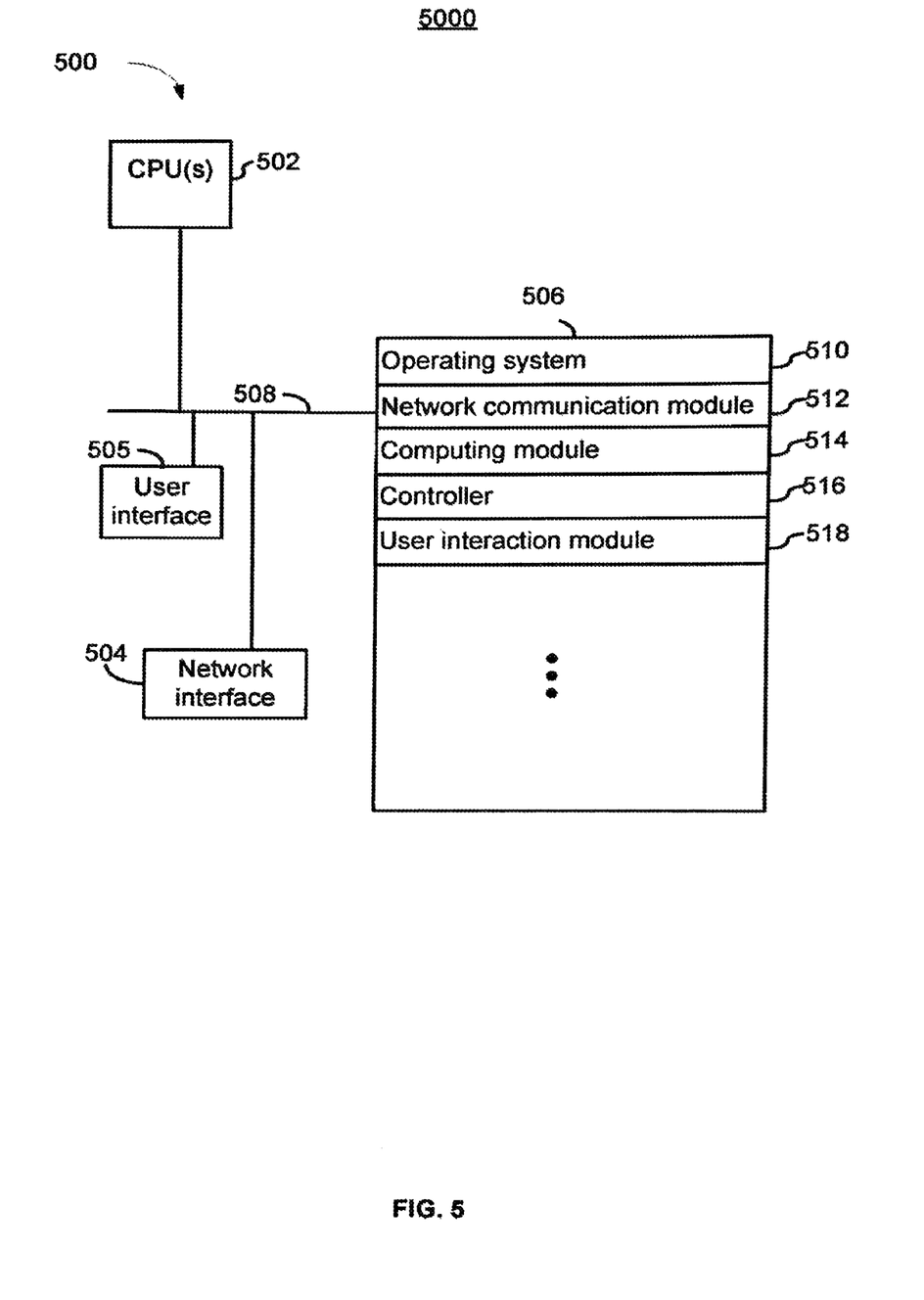
FIG. 5 is a block diagram illustrating an example computing system for implementing a method of operating the drive-through ordering system in accordance with some embodiments of the present disclosure.

FIG. 5 is a block diagram 5000 illustrating an example computing system 500 for implementing a method of operating the drive-through ordering system in accordance with some embodiments of the present disclosure. The computer system 500 may be used to operate at least the drive-through ordering system in accordance with some embodiments of the present disclosure. In some embodiments, the computer system 500 may include one or more processing units CPU(s) 502 (also referred to as processors), one or more network interfaces 505, optionally a user interface, a memory 506, and one or more communication buses 508 for interconnecting these components. The communication buses 508 may optionally include circuitry (sometimes called a chipset) that interconnects and controls communications between system components. The memory 506 may include high-speed random access memory, such as DRAM, SRAM, DDR RAM or other random access solid-state memory devices; and optionally may include non-volatile memory, such as one or more magnetic disk storage devices, optical disk storage devices, flash memory devices, or other non-volatile solid-state storage devices. The memory 506 optionally includes one or more storage devices remotely located from the CPU(s) 502. The memory 506, or alternatively the non-volatile memory device(s) within the memory 506, includes a non-transitory computer-readable storage medium. In some embodiments, the memory 506 or alternatively the non-transitory computer-readable storage medium may store the following programs, modules, and data structures, or a subset thereof:

an operating system 510 (e.g., an embedded LINUX operating system), which includes procedures for handling various basic system services and for performing hardware dependent tasks;

a network communication module 512 for connecting the computer system with a manufacturing machine via one or more network interfaces (wired or wireless);

a computing module 514 for executing programming instructions to perform operations including:

identifying a user at a first location using the camera coupled to the computing system, executing instructions local to the first location by one or more edge processors to determine one or more user specific parameters that identify the user;

determining the user is associated with a user account stored in a computerized user management system by determining that the user identified by the one or more user specific parameters matches the user account stored in the computerized user management system by comparing the one or more user specific parameters against a user account database included in the computerized user management system;

in response to the determining that the user is associated with the user account stored in the computerized user management system, transmitting an instruction to the first display coupled to the kiosk at the first location to present a user-tailored menu generated by using the edge processors to access a machine learning or behavior analysis computer model based on data obtained from the user account;

receiving a payment of one or more orders with respect to the user account by executing a payment system, wherein the payment is made on the first display or a user application associated with the user account; and in response to receiving the payment, transmitting the one or more orders to the second display coupled to the electronic device at a second location;

a controller 516 for controlling a manufacturing machine in accordance with the execution of programming instructions; and a user interaction module 518 for enabling a user to interact with the computer system 500.

The technology is operational with numerous other general purpose or special purpose computing system environments or configurations. Examples of computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a PENTIUM processor, a PENTIUM PRO processor, a 8051 processor, a MIPS processor, a POWER PC processor, or an ALPHA processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or Microsoft WINDOWS.

The system may be written in any conventional programming language such as C, C++, BASIC, Pascal, or Java, and run under a conventional operating system. C, C++, BASIC, Pascal, Java, and FORTRAN are industry standard programming languages for which many commercial compilers can be used to create executable code. The system may also be written using interpreted languages such as PERL, PYTHON or RUBY.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In some embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. In some embodiments, the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included In some embodiments are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first location could be termed a second location, and, similarly, a second location could be termed the first location, without changing the meaning of the description, so long as all occurrences of the "first location" are renamed consistently and all occurrences of the "second location" are renamed consistently. The first location and the second location are both locations, but they are not the same location.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computing system, comprising:
a non-transitory memory;
a first display coupled to a kiosk;
a second display coupled to an electronic device;
a camera coupled to the computing system; and
one or more processors coupled to the non-transitory memory and configured to execute instructions to perform operations comprising:
identifying a user at a first location using the camera coupled to the computing system, executing instructions local to the first location by one or more edge processors to determine one or more user specific parameters that identify the user;
determining the user is associated with a user account stored in a computerized user management system by determining that the user identified by the one or more user specific parameters matches the user account stored in the computerized user management system by comparing the one or more user specific parameters against a user account database included in the computerized user management system;
in response to the determining that the user is associated with the user account stored in the computerized user management system, transmitting an instruction to the first display coupled to the kiosk at the first location to present a user-tailored menu generated by using the edge processors to access a machine learning or behavior analysis computer model based on data obtained from the user account, wherein the user-tailored menu is further updated based on a busyness of a second location, which is an order preparation station;
receiving a payment of one or more orders with respect to the user account by executing a payment system, wherein the payment is made on the first display or a user application associated with the user account; and
in response to receiving the payment, transmitting the one or more orders to the second display coupled to the electronic device at the second location.

2. The system of claim 1, the operations further comprising:
determining that the user is not associated with the user account stored in the computerized user management system;
in response to determining the user is not associated with the user account stored in the computerized user management system, transmitting an instruction to the first display at the first location to present a default menu;
receiving payment of one or more orders by executing the payment system, wherein the payment is made on the first display; and
in response to receiving the payment, transmitting the one or more orders to the second display.

3. The system of claim 1, wherein the camera coupled to the computing system is an Automatic License Plate Recognition (ALPR) camera that is configured to recognize a license plate of a vehicle associated with the user.

4. The system of claim 3, wherein the one or more user specific parameters that identify the user comprises the license plate of the vehicle associated with the user.

5. The system of claim 1, wherein the camera coupled to the computing system comprises face recognition artificial intelligence or machine learning algorithms to determine the one or more user specific parameters that identify the user.

6. The system of claim 1, wherein the user-tailored menu comprises one or more of a recommendation menu, recent orders, a loyalty and reward program in association with the user account.

7. The system of claim 1, wherein the second location comprises one or more food preparing stations.

8. The system of claim 1, wherein the machine learning model is trained to identify certain features of a user's preferences, such as, identify certain aspects of a user's characteristics.

9. The system of claim 1, wherein the user-tailored menu is updated based upon updates received from the second location.

10. The system of claim 9, wherein the updates received from the second location are configured by a food preparing staff.

11. The system of claim 1, wherein the busyness is determined by an average time of preparing an order.

12. The system of claim 1, wherein the payment executed in the second display include using credit card, debit card, cash, or any wireless payment such as PAYPAL, VENMO, ZELLE, APPLE PAY, Bluetooth payment, NFC payment, or any combination thereof.

13. The system of claim 1, further comprising:
after transmitting the one or more orders to the second display at the second location, directing the user to a waiting zone by presenting a set of navigation instructions to the user.

14. The system of claim 1, further comprising:
transmitting a notification to the user application associated with the user account when the one or more orders are ready.

15. The system of claim 1, wherein the second location further comprises an auto-food maker robot, wherein the auto-food maker robot is configured to receive the one or more orders and execute an auto-food preparation system to prepare the one or more orders.

16. A method for vehicle drive-through ordering, comprising:
identifying a user at a first location using a camera coupled to a computing system, executing instructions local to the first location to determine one or more user specific parameters that identify the user;

determining the user is associated with a user account stored in a computerized user management system by determining that the user identified by the one or more user specific parameters matches the user account stored in the computerized user management system by comparing the one or more user specific parameters against a user account database included in the computerized user management system;

in response to the determining that the user is associated with the user account stored in the computerized user management system, transmitting an instruction to a first display at the first location to present a user-tailored menu generated to access a machine learning or behavior analysis computer model based on data obtained from the user account, wherein the user-tailored menu is further updated based on a busyness of a second location, which is an order preparation station;

receiving a payment of one or more orders with respect to the user account by executing a payment system, wherein the payment is made on the first display or a user application associated with the user account; and in response to receiving the payment, transmitting the one or more orders to a second display at the second location.

17. The method of claim 16, wherein the camera coupled to the computing system is an Automatic License Plate Recognition (ALPR) camera that is configured to recognize a license plate of a vehicle associated with the user.

18. The method of claim 17, wherein the one or more user specific parameters that identify the user comprises the license plate of the vehicle associated with the user.

19. The method of claim 16, wherein the camera coupled to the computing system comprises face recognition artificial intelligence or machine learning algorithms to determine the one or more user specific parameters that identify the user.

20. A non-transitory, computer readable media, comprising instructions that when executed by a processor, cause the processor to perform a method for vehicle drive-through ordering, comprising:

identifying a user at a first location using a camera coupled to a computing system, executing instructions local to the first location to determine one or more user specific parameters that identify the user;

determining the user is associated with a user account stored in a computerized user management system by determining that the user identified by the one or more user specific parameters matches the user account stored in the computerized user management system by comparing the one or more user specific parameters against a user account database included in the computerized user management system;

in response to the determining that the user is associated with the user account stored in the computerized user management system, transmitting an instruction to a first display at the first location to present a user-tailored menu generated to access a machine learning or behavior analysis computer model based on data obtained from the user account, wherein the user-tailored menu is further updated based on a busyness of a second location, wherein the second location is an order preparation station;

receiving a payment of one or more orders with respect to the user account by executing a payment system, wherein the payment is made on the first display or a user application associated with the user account; and in response to receiving the payment, transmitting the one or more orders to a second display at the second location.

\* \* \* \* \*